United States Patent [19]

Franklin

[11] Patent Number: 4,858,054
[45] Date of Patent: Aug. 15, 1989

[54] PROTECTIVE CIRCUITS AND DEVICES FOR THE PREVENTION OF FIRES

[76] Inventor: Frederick F. Franklin, 3501 Tiffany Ridge, Cincinnati, Ohio 45241

[21] Appl. No.: 195,591

[22] Filed: May 18, 1988

Related U.S. Application Data

[63] Continuation-in-part of Ser. No. 731,510, May 7, 1985, abandoned.

[51] Int. Cl.$^4$ .............................................. H02H 3/20
[52] U.S. Cl. ........................................ 361/57; 361/55; 361/93; 361/105; 361/111
[58] Field of Search .................................... 361/24–27, 361/54–57, 91, 93, 104, 105, 106, 110, 111

[56] References Cited

U.S. PATENT DOCUMENTS

| | | | |
|---|---|---|---|
| 3,543,090 | 11/1970 | Pfister et al. | 361/27 |
| 3,579,036 | 5/1971 | McCoy | 361/57 |
| 3,878,434 | 4/1975 | Voorhoeve | 361/55 |
| 3,887,849 | 6/1975 | Nagel | 361/56 |
| 4,242,713 | 12/1980 | Lewis, Jr. et al. | 361/104 |
| 4,310,837 | 1/1982 | Kornrumpf et al. | 361/106 |

*Primary Examiner*—A. D. Pellinen
*Assistant Examiner*—Jeffrey A. Gaffin
*Attorney, Agent, or Firm*—Kinney & Schenk

[57] ABSTRACT

Protective circuits for preventing fires due to arc short circuits (as opposed to dead short circuits), are described. Current flow in excess of that existing during normal transient overloads is indicative of an arc short circuit. Protection is provided by triacs which are triggered by circuit current flow in excess of that existing during normal transient overloads. When triggered, the triacs, in series with the fuse or circuit breaker, are placed directly across the power source and thus actuated substantially instantaneously to interrupt current flow to the load circuit. By thus interrupting current flow the hazard of a fire is obviated. Means are also provided for giving a visual indicium that the protective circuit has been actuated by triggering of the triacs. Additional means are provided for triggering the triacs in response to an overheated main electrical service connection. Also disclosed are a novel circuit breaker cartridge, an adapter for insertion in a receptacle, a receptacle and a connecting plug, each comprising a triac and a current sensing impedance, which function to actuate a circuit breaker or fuse to achieve the same protection against arc short circuit fires.

27 Claims, 6 Drawing Sheets

PROTECTIVE CIRCUITS AND DEVICES FOR THE PREVENTION OF FIRES

The present application is a continuation-in-part of my copending application Ser. No. 731,510, filed May 7, 1985, now abandoned.

The present invention relates to improvements in the prevention of electrical fires and more particularly to improved protective circuits and devices which are actuated by current flow across an arcing short circuit, or extraneous current flow of a similar or greater energy level.

Electrical fires are one of the primary categories of casualty losses. It will be observed that the term "electrical fire" is a misnomer to the extent that electricity is simply the energy source for ignition of combustible material. By whatever name, the problem is significant, as evidenced by the reported 6.7 billion dollars in fire losses for the year 1984.

In a broad sense there are three types of electrical fires, where electrical service is provided through circuits having a current rating for safe, steady state operation.

When the current rating is exceeded for a prolonged period, an overcurrent condition exists which can generate sufficient heat to burn insulation and ignite combustible material. Circuit breakers and fuses are generally effective in providing protection against this overcurrent type of fire.

Electrical fires can also be caused by short circuits, where there is a rapid increase in current flow to relatively high levels. Fuses and circuit breakers are also relied upon to prevent short circuit type fires.

The third type is where overheating occurs as a result of current flow that does not exceed the current rating of the circuit. A soldering iron left in contact with combustible material is an example. Fuses and circuit breakers do not provide any real protection against this type of fire.

It is generally assumed that a short circuit involves contact of an energized conductor with a grounded conductor, or a conductor of opposite polarity. In such case, referenced as a "dead" short, there is essentially no resistance to current flow. Consequently there is an instantaneous increase in current flow to a value sufficient to "blow" a fuse, or "trip" a circuit breaker. The energy of short circuit current flow is quickly limited by both fuses and circuit breakers so that these conventional devices are also generally effective in preventing fires when a "dead" short occurs in an electric circuit.

The shortcomings of these protective devices arises from the fact that there is a second class of short circuits, which has but limited recognition and is often not identified as a cause of a fire, by fire investigators.

This second class arises where the short circuit occurs between two conductor which are spaced apart, as opposed to being in direct contact. This situation can arise, for example, where there is a deterioration of the insulation which separates the conductors. When this occurs, there can be ionization of the air gap between the conductors and current flow through an arc. There is, thus, a high, short circuit current flow between the conductors. However, in such an "arc" short circuit, the arc itself has substantial resistance, which puts a limit on the current flow. This is in contrast to the essentially zero resistance across a "dead" short which imposes only minimal resistance to flow. "Dead" short current can, theoretically, rise to an infinite value.

It has been demonstrated that, in a "dead" short circuit, current increases, substantially instantaneously, to over 800 amperes (at 120 volts in a nominal 15 ampere circuit) which is sufficient to trip the least sensitive of several circuit breakers tested. It will be noted that 120 volt, 15 ampere circuit breakers vary widely in their operating characteristics. More sensitive units trip when current flow reaches 120 to 180 amperes (8 to 12 times rated flow) while others required 800 amperes (over 50 times rated flow) to trip substantially instantaneously. If substantially instantaneously tripping is not achieved in short circuit failures, there is a reduced assurance of preventing a fire.

Most circuit breakers have an electromagnetic mechanism which becomes effective to open its contacts when current levels reach a relatively high limit. Once that limit is reached, the response time for tripping is extremely short. The wide disparity in current levels required to trip different circuit breakers reflects the varying limits required to actuate the electromagnetic mechanism, or force, which opens the contacts.

Other tests have demonstrated that "arc" short circuit current flow also increases substantially instantaneously, but to a maximum value as limited by the arc resistance. This maximum value of "arc" short circuit current flow has been found to vary, generally between about 150 amperes and 400 amperes. It has also been found that "arc" short circuit current flow is further characterized by being intermittent. That is current flow through an arc will be initiated and then, after a brief duration, the arc will extinguish and then later be reestablished.

It has further been demonstrated that the energy of these "arc" short circuits is sufficient to ignite flammable material which would be found in residences or in other locations where fire would be a hazard. Finally, and most importantly, it has been demonstrated that such "arc" short circuit fires can and do occur without tripping conventional circuit breakers. Thus there is a misplaced reliance on these devices serving the purpose for which they are installed.

Demonstration that "arc" short circuit fires occurred without tripping circuit breakers was done with breakers rated at 15 amperes. Higher rated circuit breakers require higher currents to actuate the electromagnetic mechanism. These circuit breakers allow even more current, and energy, to pass to a short circuit and thus increases the likelihood of igniting a fire.

It is also to be noted that it is a generally accepted presumption that, unless there has been a circuit breaker malfunction, a short circuit is often ruled out as the cause of a fire. The referenced tests indicate the fallacy of this presumption.

A survey of fire investigations which ignored this general presumption has identified fires originating from "arc" short circuits and leads to the conclusion that about 20% of fires are caused by "arc" short circuits in 120 volt, 15 and 20 ampere circuits and another 10% in circuits having other voltages and current ratings.

The inadequacies of fuses and circuit breakers stems from the fact that they are not, strictly speaking, current limiting devices, but, instead, are energy limiting devices. The reason for this is that it is desired, or necessary for these devices to be non-responsive to normal overloads.

It is established practice for such devices to have a current rating, 15 and 20 amperes being common for residential branch circuits. This is the limit for current flow under steady state, continuous operation of a load circuit and represents a safe energy level for that circuit.

However, transient conditions are normally encountered where a load draws a higher amperage for a short period of time. For example, the resistance of an incandescent bulb, at normal ambient temperatures is relatively low. When the bulb is first energized, there is a high current flow, say 12 amperes for a 150 watt bulb in a 120 volt circuit. Current flow is very rapidly reduced to a steady state value of about 1.25 amperes as the temperature of the bulb's resistance element reaches its operating temperature, in the order of 3,000 degrees Fahrenheit.

Placing two bulbs in service simultaneously would result in some 24 amperes being drawn by the load circuit. Similarly an electrical motor drawing 6 amperes in steady state operation could drawn 30 amperes when first energized. Such excursions above rated current flow (15 amperes) are of such short duration that the energy generated is insufficient to create a hazard.

The energy responsive characteristic of fuses and circuit breakers makes them non-responsive to these amperage excursions above rated value, which are incident to these normal transient overloads.

Energy is a combined function of amperage and time. Fuses and circuit breakers are thermally (energy) responsive. When a current excursion, above rated value, is of sufficient magnitude and/or duration, to create a given heat rise, either device is actuated to interrupt current flow to the load circuit. In a fuse, a fusible link melts to interrupt current flow. In a circuit breaker, a bimetallic link flexes to separate a set of contacts to interrupt current flow. In circuit breakers it is also common to provide an electromagnetic mechanism to accelerate opening of the interrupting contacts.

The problem which has not been recognized is that the energy levels of many "arc" short circuits is insufficient to trip many, if not all, conventional circuit breakers and at least some conventional fuses. There is, further, a failure to recognize that such "arc" short circuits have sufficient energy to ignite fires, particularly where they are intermittent, but repetitive.

The end results is that there is a failure to adequately provide protection from "arc" short circuit fires by these conventional devices.

Accordingly, the broad object of the present invention is to provide improved protection against electrical fires and more particularly fires originating from "arc" short circuits.

Such ends are attained by a protective circuit which includes a load circuit connected across an electrical power source, with a current interrupter connected in series with the load circuit. The current interrupter may be a conventional circuit breaker or fuse.

Sensing means monitor current flow to the load circuit. When this flow exceeds the maximum current flow for normal transient overloads, dumping means are rendered operative to connect the current interrupter across the power source. Current flow through the current interrupter is then increased to a value causing its actuation and interruption of current flow to the load circuit. All of this occurs substantially instantaneously to the end that there is a high level of assurance that short circuit flow will not reach an energy level capable of igniting a fire.

The current sensing means may comprise an impedance connected in series between the current interrupter and the local circuit. Either a resistor or an inductive coil, in an alternating current circuit, may serve this purpose.

The dumping means preferably comprise at least one triac, having its main terminals connected in series between one side of the circuit interrupter and the other side of the power source. One main terminal and the triac gate terminal are connected across the current sensing impedance. The triac is triggered to an operative state by an increase in the voltage drop across the impedance exceeding a value which reflects the maximum current flow during normal transient overloads in the load circuit. This triggering current flow would also be substantially higher than the rated value of the current interrupter.

Triacs generally require a series resistor so that current flow does not exceed their rated value. In the present circuit the current limiting resistor is not in series with the load circuit so that there are no energy losses during normal operation of the circuit. Energy losses are further minimized by selecting a triac which is triggered by a sensor voltage of about 0.4% of the potential of power source, which would be 0.5 volt in a 120 volt circuit.

The foregoing circuit finds greater utility where the current interrupter is a circuit breaker. This preference is based on the fact that the energy response characteristics of circuit breakers, or at least a greater portion thereof, makes them particularly inadequate in providing protection against "arc" short circuit fires.

Where the circuit is employed in an alternating current circuit, the sensing impedance may, advantageously be an inductance. Where the current interrupter is a circuit breaker, the coil which assist in opening contacts to interrupt current flow, may provide the function of a current sensor.

When a fuse or circuit breaker is actuated it is accepted procedure to identify and correct a cause of failure before replacing the fuse or resetting the circuit breaker. With these devices there is no way of distinguishing between an overload failure and a short circuit failure, which could facilitate correction of a defective condition.

Accordingly another object of the present invention is to provide means for distinguishing between overload failures and short circuit failures.

Such end is broadly attained, in a protective circuit having a dumping means, by providing indicia means for indicating if there has been current flow therethrough which actuated the current interrupter.

In a protective circuit incorporating a triac in the dumping means, the indicia is actuated by current flow through the triac. Where a plurality of triacs are employed, a neon bulb is connected to the upstream side of the current interrupter and then to the downstream side of one of the triacs. A common return conductor is provided for the bulb and that triac. A fuse is interposed in this common conductor. When the current interrupter is actuated by current flow through the triac the fuse is blown. The bulb is extinguished to indicate a short circuit failure.

Another source of electrical fires, i.e., fires ignited by electrical energy, exists when a resistance is inadvertently created in a circuit. This is typified in the use of aluminum wiring. Where an aluminum conductor is connected to a connector, as in a main service connection, any buildup of aluminum oxide at the connection will introduce an electrical resistance and a resulting heat source, which, if undetected, can raise temperatures to a level causing ignition, all without increasing current flow to a level sufficient to "trip" a circuit breaker of "blow" a fuse.

Other resistances can also be created in an electrical circuit and become the source of an electrical fire, without an increase in current flow which would shut the circuit down.

Accordingly, another object of the present invention is to interrupt current flow through a load circuit in response to temperature rises caused by localized circuit resistance arising from some abnormal condition.

In attaining these last identified ends, an auxiliary input, responsive to such temperature rise, is provided to actuate the current dumping means and thus actuate the current interrupter in a minimum time.

A further factor to consider in providing improved protection against short circuit fires is the hundreds of millions of existing electrical service connections which are vulnerable to this hazard. While justifiable on an economic basis, their replacement by more reliable means would not be a practical expectation.

The need for improved protection in existing wiring circuits has been recognized by at least one proposal to provide a fused plug for the cord of an electrical appliance. This gives a high level of assurance that the appliance using the fused plug will not be the source of an electrical fire.

This approach has the disadvantage of requiring replacement of the fuse where there is a failure. Also the protective feature of such a fuse can be defeated by providing an alternate conductor when a replacement fuse is not available. This would be similar to the practice of putting a coin under a fuse to obtain energization of a branch circuit.

Accordingly, another object of the present invention is to provide means which can be incorporated into or used with existing circuit components.

Another object of the present invention is to attain the foregoing ends through the use of components which can be readily incorporated in existing electrical service installations.

In one aspect of the invention these ends are attained in a circuit breaker cartridge which is insertable in existing circuit breaker receptacles and which further includes dumping means for accelerating opening of the circuit breaker contacts in response to short circuit current flow.

In accordance with another aspect of the invention, an adapter is provided to provide short circuit protection. The adapter has male connectors insertable into an outlet receptacle, or the like, in a branch circuit and has female connectors providing means for connecting an electrical load thereto. The adapter includes dumping means which are rendered conductive in response to current flow exceeding the maximum for normal transient overloads. When conductive the dumping means increase current flow through the current interrupter (a fuse or circuit breaker) of the branch circuit to substantially instantaneously actuate the current interrupter.

The dumping means include a triac and the current sensor advantageously takes the form of a length of resistive material which is incorporated between the male and female connectors. In a preferred form the adapter has two pairs of male connectors respectively connected to two pairs of female connectors. The male connectors are insertable into the two pairs of a standard duplex outlet receptacle. Another feature of the invention is found in the provision of a one way drive screw for securing the adapter to the receptacle, whereby its protective function cannot be readily defeated by removal of the adapter.

These objects of the invention may also be attained by a receptacle having dumping means which are conductive to increase current flow between the primary conductors of a branch circuit in response to an increase in current flow to a load connected to the receptacle. Again the increase in current flow would be to a level exceeding the maximum current flow for normal transient overloads.

These objects can also be attained by a plug having a dumping circuit. The plug is mounted at the end of an electrical cord connected to an appliance, or the like. Means, preferably in the form of a length of resistive material incorporated in one of the male connectors of the plug, are provided for sensing current flow to the load. When this flow exceeds the maximum for normal transient overloads, the dumping means are conductive to provide a current flow path between the two male connectors of the plug. Current flow through the current interrupter for the branch circuit in which the plug is connected, is increased to substantially instantaneously interrupt current flow to the load.

The adapter, receptacle and plug provided by the present invention are connected in a branch circuit remote from the service entrance where the current interrupter is located. In normal operation the line resistance of the primary connectors is so small that the minimal voltage drop it causes is inconsequential. However, it is of significance in "arc" short circuits.

As indicated, an "arc" short circuit occurs where conductors are spaced apart. The potential between these conductors ionizes the air so that there is current flow therebetween. Creation of an arc and current flow is a function of the voltage potential. Once an arc is established, there is an increase in current flow in the primary conductors connecting the load to the service entrance. The voltage drop in these conductors increases proportionately. This, in turn, results in a decrease in the voltage across the arc and can result in extinguishment of the arc. This explains, in part, the fact that "arc" short circuits are intermittent in nature.

Where the protective devices are remotely located, when the dumping means are conductive, there is an additional increase in the current flow through the primary conductors and an additional voltage drop which further reduces the voltage across the arc. The voltage drop resulting from dumping current flow can be sufficient to cause extinguishment of the arc and interrupt short circuit current flow even before the current interrupter is actuated to obtain this result.

The above and other related objects and features of the invention will be apparent from a reading of the following description of the circuits and devices shown in the accompanying drawings and the novelty thereof pointed out in the appended claims.

Figure 1:
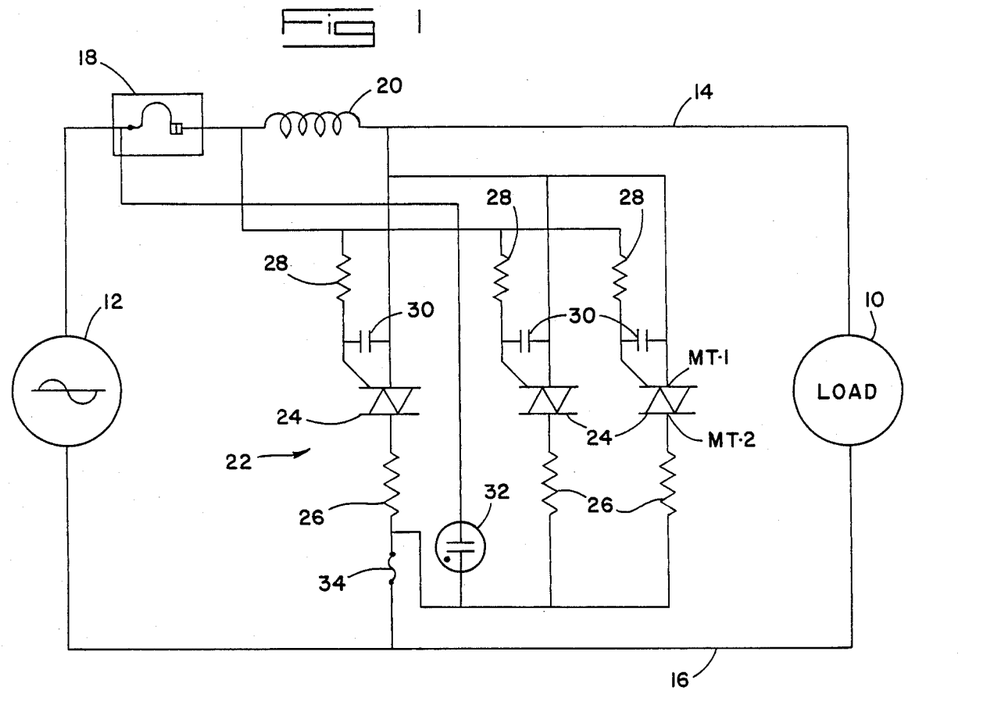
FIG. 1 is a schematic of protective, current interrupting circuit embodying the present invention.

Referencing FIG. 1, the present circuit is shown as it would be used with a conventional electrical circuit in which a load 10 is connected across a power source 12 by conductors 14, 16. Conventional overload protection is provided by a circuit breaker 18.

A current sensing impedance in the form of a coil 20 in conductor 14, is connected in series with the load 10. Means, indicated generally by reference character 22 and herein referenced as dumping means, are provided to increase current flow through the circuit breaker 18 when a short circuit occurs, in a manner shortly to be described.

Figure 2:
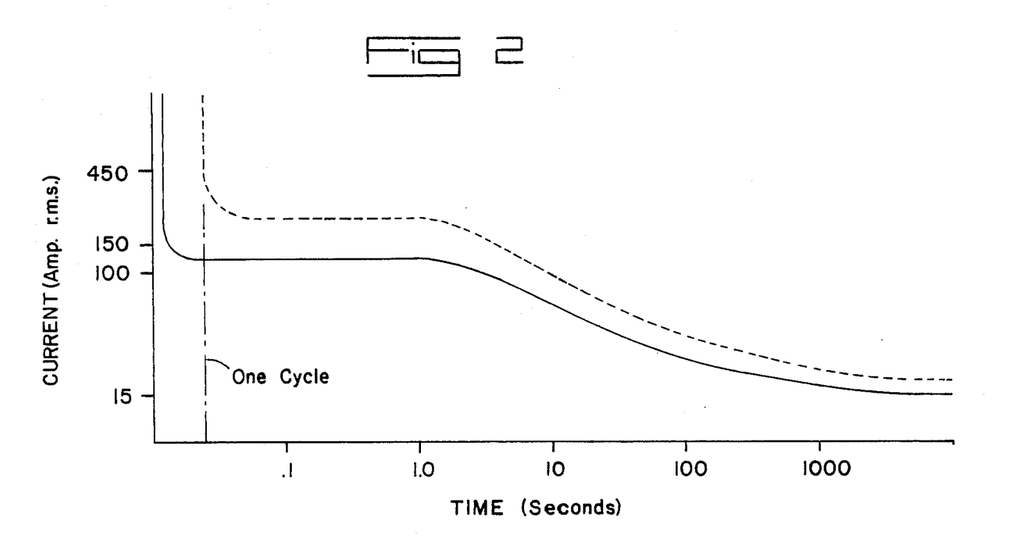
FIG. 2 is a plot illustrating the tripping characteristics of a typical circuit breaker.

Before describing operation of the present circuit, reference is made to FIG. 2, which illustrates a typical response curve for a circuit breaker rated at 15 amperes. The x-axis represents time, plotted on a logarithmic scale and y-axis, current, in amperes (r.m.s.), also on a logarithmic scale.

The solid line plot represents what is referenced as a "response curve". This solid line plot is typical of the more sensitive, or quicker tripping circuit breakers available in the United States. At lower amperages, the response curve gradually increases in amperage as time decreases. This gradual slope represents the action of the circuit breaker under normal overload conditions. Thus, where the overload, or overcurrent, condition is only slightly above the rated current, say 15.5 amperes, a relatively long time is required to trip the breaker. As the increment of excess current, above rated flow, increases, tripping time is gradually reduced until a plateau of about 120 amperes (8 times rated flow) is reached. When this plateau is reached, tripping can occur between 1.0 second and 0.0167 second (one full cycle at 60 c.p.s.). Above 120 amperes, the response curve has a "knee" where tripping time is quickly reduced to a half cycle at 225 amperes. The "knee" portion of the curve indicates the current level at which the electromagnetic mechanism becomes effective in very rapidly opening the circuit breaker contacts and interrupting current flow.

Because of manufacturing tolerances, there is, actually a range of values at which a circuit breaker will trip. The upper limit of this range is illustrated by the broken line plot in FIG. 2. From these plots, it will be seen that approximately 30 times rated current, or 450 amperes would be required to guarantee tripping of the circuit breaker within a time of one current cycle (assuming standard 60 c.p.s. current). Similarly, at stabilized, steady state condition, a current flow of 18 amperes may be required before tripping occurs, this being within the normal tolerance of a fifteen ampere fuse, or circuit breaker rating.

The range of current values at which a circuit breaker will trip in a given period of time also reflects different circuit breaker designs commercially available in the United States.

Almost all electrical loads draw several times their steady state requirements, when initially connected in a circuit. To briefly expand on this point, an incandescent lamp is simply a resistance element connect across an electrical potential. Its resistance is a function of temperature. When initially connected across a 120 volt potential, a 150 watt bulb could draw as much as 12 amperes. However, in a fraction of a second, the resistance element rises to some three thousand degrees, the resistance of the element increases and the steady state current becomes 1.25 amperes. Electric motors have a similar characteristic of drawing several items rated current at start up. Circuit breakers, with their time delay characteristic for tripping, adequately protect against potentially hazardous overloads, i.e., overcurrent conditions of relatively low magnitude, without nuisance tripping for what are normal operating conditions.

This accommodation of normal overloads, or overcurrent conditions, results from the above discussed characteristic involving the fact that it is the thermal energy input to the bimetallic element which causes it to flex and interrupt current flow to the load circuit. The energy of normal overloads is insufficient to ignite a fire and thus may be, and is, safely passed by the circuit breaker.

Further referencing FIG. 2, where there is a "dead" short, current flow substantially instantaneously reaches a value exceeding the value at the "knee" of either curve and current flow is interrupted in one current cycle, or less, or within the minimum time capability of the breaker. This response provides effective protection from "dead" short ignition of fires.

FIG. 2 also illustrates the hazard of "arc" short circuits. In this type of short circuit, current flow can range from 150 to 400 amperes. it will be seen that, within the range of circuit breaker characteristics, current flow of 150 amperes, or more is permitted through the circuit breaker, without interrupting current flow, for as long as ten seconds. The point is that the circuit breakers of this type can pass, without being tripped, energy drawn through an "arc" short circuit which is more than sufficient to ignite combustible material and initiate a destructive fire. Remembering that "arc" short circuits have a characteristic of extinguishing themselves and reestablishing the arc, it will be appreciated that even relatively high amperage and energy levels may be passed by a circuit breaker, without its tripping.

Thus, with such intermittent, but repeated flow, extremely high energy inputs can be created for the ignition of a fire.

From the foregoing, it will be appreciated that both short circuit flow and normal operation of electrical load circuits involve current flow in excess of what would be the rated current flow of the circuit, as determined by the circuit breaker, or fuse. The present invention is predicated on distinguishing between these current flows.

In accomplishing these ends, the characteristics of the means 22, which increase current flow through the circuit breaker 18, are significant. The means 22 perform a dumping function in providing a flow path which increases current flow through the circuit breaker to or above the amperage which trips the breaker in the minimum time for that particular breaker. (For a more complete understanding of the concepts here involved, it will also be noted that "arc" short circuit current flow can be sufficiently high to trip a few types of circuit breakers.)

Remembering that there is substantial current flow through the "arc" short circuit, it is only necessary to increase current flow to a value exceeding the value bringing amperage to the vertical portion of the curve seen in FIG. 2. To illustrate, assume that minimum reaction, or opening time occurs at 800 amperes. Assume further the "arc" short circuit flow is 100 amperes. It is then necessary that 700 amperes flow through the dumping means in order to achieve a minimum reaction time in tripping the breaker. Actually, it is not necessary that the full 800 amperage level be reached. Significant protection is achieved simply by increasing the current flow to, or above, the "knee" of the curve, say 350 amperes for the least sensitive breakers as shown by the dotted plot in FIG. 2. The "knee" indicates the amperage level at which the electromagnetic mechanism becames effective to trip the circuit breaker.

Thus the desired characteristics of the dumping means 22 are that, when actuated, it immediately pass sufficient current to increase current flow through the circuit breaker to an amperage, which, in combination with the short circuit current flow, is high enough to bring it to the "knee" of the response curve of the least responsive circuit breaker contemplated, and preferably to a level providing minimum response time.

Describing the dumping means 22 in greater detail, three triacs 24 are connected in parallel across conductors 14, 16, downstream of the coil 20. A current limiting resistor 26 is connected in series with each of the triacs 24. The gate terminals of each of the triacs are connected, respectively, through current limiting resistors 28 to the upstream side of the coil 20. Also capacitors 30 are respectively connected between the gate terminals and the top, MT-1 terminal of the triacs 24.

Triacs have characteristics uniquely applicable in attaining the ends of the present invention. They are sometimes referenced as bidirectional thyristors, and can be thought of as back to back SCR's. They are voltage triggered, i.e., when the voltage between the gate terminal and the upstream main terminal, M-1, exceeds a predetermined value, they become bidirectionally conductive, with a very minimal impedance. Further, once conductive, they remain so until there is a complete interruption of current flow. Of significant importance in the present instance is that they are triggered in response to the instantaneous voltage value, in contrast to the circuit breaker's response to the root mean square value of current flow.

Triacs are commercially available with very low triggering voltages, 0.5 volt being exemplary. This means that the energy loss in the coil 20, which establishes the gate/MT-1 potential, is negligible. Any increase in current flow above the established "normal" transient current flow of 105 amperes, r.m.s., i.e., an absolute value in excess of 150 amperes, will cause the voltage drop across the coil 20 (which is appropriately configured) to exceed 0.5 volts and each of the triacs 24 would become conductive. This would be approximately 0.4% of an operating voltage of 120 volts. At a rated current flow of 15 amperes the energy loss becomes insignificant.

When the triacs are triggerred to a conductive state, current immediately flows from conductor 14 to conductor 16, bypassing the load and the short circuit. This increase in current flow is instantaneously reflected in the bimetallic element of the circuit breaker 18. The magnitude of this current is preferably in excess of 450 amperes, which is the current (remembering that the short circuit has already increased current flow) required to guarantee tripping of the circuit breaker in the minimum time of one full current cycle to one half of a current cycle.

It is to be noted that triacs are surge current rated, that is there is a maximum, design, surge current which they will carry. Thus resistors 26 are provided to assure that this limit is not exceeded. The resistors 28 similarly protect the gate terminals of the triacs. The capacitors 30 are provided to prevent inadvertent triggering of the triacs due to voltage surges, which are particularly likely to be encountered upon initial energization of the load circuit.

While a single triac can be employed, the use of a plurality of triacs, in parallel, as illustrated, is preferred. Economy and reliability dictate this preference. The object sought is to "dump" current at a maximum rate, once an abnormal current surge is detected. Where the current to be "dumped" is in the order of 450 amperes, a single triac having this high a rating is relatively expensive. The use of three triacs having a 150 ampere rating is more economical. Further, it is to be expected that manufacturing tolerances will result in some variation in the gate voltage at which the triacs will become conductive. With the use of parallel triacs, there is a greater assurance that "dumping will be initiated at the desired threshold for detecting short circuit current. It is, of course, apparent that current flow through one of the triacs will increase the voltage drop across the coil 20 and positively trip the remaining triacs.

The number of parallel triacs employed for a given type of circuit will depend on many parameters, and the use of three, as shown herein, is exemplary of the preferred use of a plurality of triacs.

Summarizing operation of the circuit of FIG. 1 (rated for 15 amperes), operation of the electrical load continues uninterrupted, so long as steady state current flow remains below that rated value. Likewise normal current surges, or transients, as in start up operation, do not result in current interruption, inasmuch as the heat generated in, or energy input to, the circuit breaker is insufficient to cause its contacts to open. Likewise the voltage drop across the coil 20 remains below 0.5 volt so that the triacs remain non-conductive.

However, should the current flow exceed the limit of 105 amperes, characteristic of "arc" short circuit current flow, the voltage drop across coil 20 will instantaneously exceed 0.5 volt. This will cause the triacs 24, or at least one of them, to become conductive on the first half cycle of current flow in excess of the 105 r.m.s. ampere limit. Instantaneously current flow through the circuit breaker 10 will increase to 450 amperes plus whatever current flow there may be through the load and "arc" short circuit. Thus there is an interruption of current, by tripping of the circuit breaker, within a half and, at the most, one full cycle of current flow in the majority of commercially available circuit breakers, particularly those used in the United States.

The responsiveness of the dumping means is enhanced by the triacs being triggered by an instantaneous voltage, i.e., a short circuit current surge of significant magnitude can cause a voltage rise in the coil 20 in substantially less than a half current cycle.

It has been found that the energy of a short circuit current flow for the limited period of time required to trigger the triacs and trip the circuit breaker is insufficient, under almost all conditions, to cause ignition of an electrical fire. Thus the objective of the present invention to prevent fires originating from a short circuit is attained.

To briefly expand on this characteristic of the present circuit, in fire investigations, it is widely accepted that, if there is melting through of electrical wiring, a short circuit has occurred and its energy would have been sufficient to provide the source of ignition for a fire. Conversely, lack of melted wiring is a basis for eliminating a short circuit as a source of ignition for a fire.

Repeated testing of the present circuit has demonstrated that, when wiring is brought into contiguous relation, simulating the conditions for an "arc" short circuit, the present protective circuit has sufficient responsiveness to trip the circuit breaker prior to short circuit energy reaching a level which would cause the wiring to melt, i.e., to melt through so that the conductor is severed. Thus it has been demonstrated that current flow is interrupted with sufficient rapidity to achieve the desired end of preventing short circuit fires.

It is also to be noted that should an overload occur, causing a current surge less than the 105 r.m.s. amperes, or whatever upper limit is established for maximum current flow under normal transient overloads, but of a duration exceeding the limits indicated in FIG. 2, then the circuit breaker 18 will be energized in normal fashion to interrupt current flow, thereby preserving this conventional, and necessary function of such devices, as well as the other advantages characteristic of such devices.

Once the circuit breaker is tripped, it can be reset in normal fashion, taking the usual precaution of attempting to identify the cause of tripping. The circuit of FIG. 1 provides means to facilitate identification of the cause of circuit breaker tripping. Thus a neon bulb 32 may be connected from the upstream side of the circuit breaker 18 to the downstream side of the limiting resistor 26 on the MT-2 side of one of the triacs 24, with a fuse 34 being in series with the MT-2 side of that triac to the return conductor 16, downstream of the connection with the bulb 32.

If the circuit breaker 18 has been tripped because of a short circuit, current flow through the triac in series with the fuse 34 will cause it to "blow" creating an open circuit. Thus an operator is put on notice by the absence of illumination from the bulb 32 that the circuit breaker has tripped because of a short circuit. He should then correct the short circuit condition before resetting the circuit breaker. However, should he fail to do so, and reset the circuit breaker, protection from short circuit hazards is still afforded by the remaining two triacs in the parallel protective, dumping circuit.

The circuit of the present invention is also applicable to detecting short circuits in a direct current circuit. It may also be employed in combination with a fuse rather than a circuit breaker. Both of these, and other, alternatives are illustrated in FIG. 3.

It is to be noted that fuses and circuit breakers comprise a class of current interrupters which are thermally responsive to interrupt current flow to a load when steady state current exceeds a rated value. Both are insensitive, or non-responsive, to current surges encountered in transient overloads, as during start up conditions where load resistance is low. This is to say that an overload of several times rated current flow for a limited duration will not melt the fusible element of the fuse. When that time limit is exceeded, melting occurs and current flow is interrupted. Likewise, an extremely high current transient, as in a "dead" short, will result in an almost instantaneous melting of the fusible element and interruption of current flow.

Figure 3:
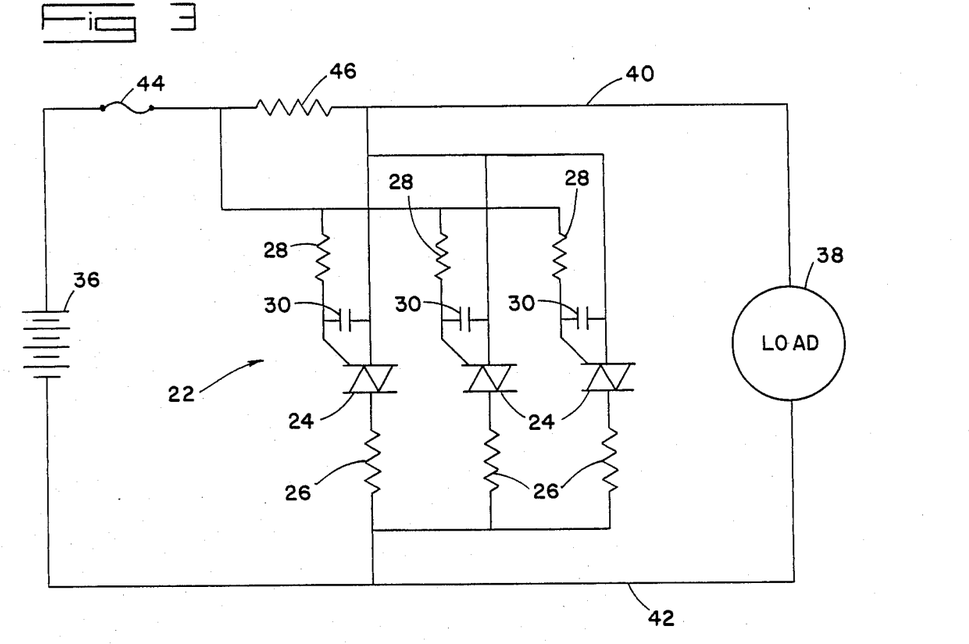
FIG. 3 is a schematic of an alternate version of the circuit of FIG. 1, incorporated in a direct current circuit.

Reverting to FIG. 3, a direct current power source 36 is connected across a load 38 by conductors 40, 42. A conventional fuse 44 is connected in series with the load 38. A current sensing resistor 46 is connected in series between the fuse 44 and the load 38. The same current dumping means 22, previously described (the lamp 32 and fuse 34 are omitted for simplicity) are connected between the upstream side of the sensing resistor 46 and the return conductor 42, in parallel with the load 38.

Operation of this circuit is essentially the same as that of FIG. 1. The tripping voltage imposed on the gate terminals of the triacs is proportional to load circuit current flow through the resistor 46, i.e., the voltage drop thereacross. Up to the point where current flow does not exceed "normal" overload limits, this voltage is insufficient to trip the triacs.

If this "normal" overload limit is exceeded, then the voltage drop across the resistor 46 increases above the 0.5 volt exemplary voltage to trip the triacs 24. This immediately dumps current in parallel to the load 38, to increase current flow through the fuse 44 and substantially instantaneously to "blow" it and interrupt current flow before sufficient energy can be generated by the short circuit current to ignite combustible material. Again, should circuit current flow exceed rated steady state flow for duration beyond designed time limits, the fuse will blow and provide overload protection, albeit that the dumping circuit was not actuated.

Inasmuch as current flow is unidirectional in direct current circuits, SCR's can be substituted for triacs in the dumping means.

Circuit breakers have been employed for decades to protect electrical load circuits from overload hazards. Their design is well matured, with standard, envelopes of compact, minimum dimensions, which may be plugged into existing, standardized receptacles.

The circuit of the present invention may be incorporated generally within the envelopes of existing circuit breakers and thus can be inserted into present circuit breaker receptacles. Thus the added protection afforded by the present invention can be economically added as an upgrade for existing electrical services.

Figure 4:
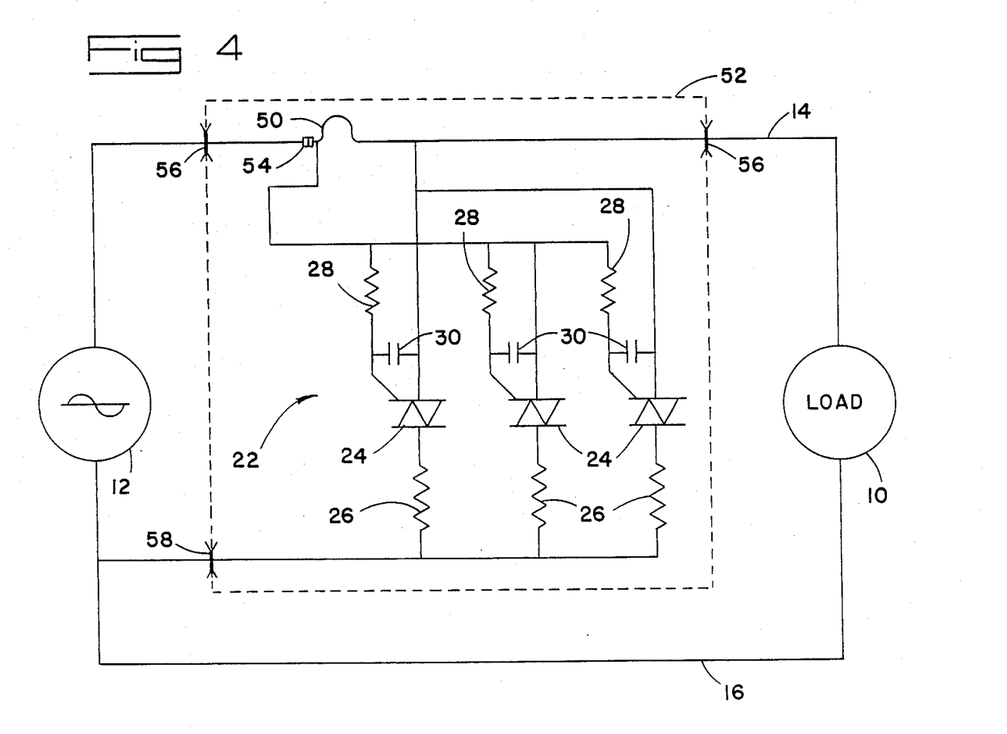
FIG. 4 is a schematic of another alternate circuit, in which the bimetallic element of the circuit breaker serves as a current sensor.

As will be apparent from the following description of FIG. 4, these ends are advantageously attained by employing the bimetallic element which controls the breaker contacts as the current sensing element which detects short circuit current flow. In doing so, even the negligible loss associated with a separate current sensor is eliminated.

In FIG. 4, the same power load 10 is connected across a power source 12 by conductors 14 and 16. The circuit breaker is more accurately described as a bimetallic element 50 mounted within a casing having a physical outlined indicated by a broken line 52. The bimetallic element 50 controls contracts 54, both it and the contacts being placed in series with the load by spring loaded, pressure contacts 56 respectively connecting with the conductor 14 and one side of the power source 10.

Again the same dumping means 22, as described in connection with FIGS. 1 and 3 may be employed. These means are disposed within the casing 52 with one side of the parallel traics 24 connected to the downstream side of the bimetallic element 50 and the other side being connected through a pressure contact 58 to the conductor 16, or the other side of the power source 12. If a pressure contact is not available, a wire lead may be employed.

The gate terminals of the triacs 24 are connected to the upstream side of the bimetallic element 52, thus placing the voltage drop across the bimetallic element across the gate terminals of the triacs and their upstream main terminals MT-1. The combined resistance and reluctance of the bimetallic element 50, isolated from the resistance of the contacts 54, provides sufficient impedance to produce the required triggering voltage when current flow through the load circuit exceeds "normal" overload values. Thus the dumping means will be actuated, as above described, to increase current flow and trip the circuit breaker, i.e., open the contacts 54 and protect the circuit against the hazards of short circuit current flow.

As was further indicated above, one of the objectives of the present invention is also to minimize electrical fires caused by overheating. This is a hazard particularly associated with the use of aluminum wiring an arises from the fact that aluminum oxide has a relatively high electrical resistance. Pressure contact is commonly employed to connect electrical conductors with various devices, such as by the use of headed screws. For various reasons, the interface pressure with aluminum conductors will decrease, permitting the buildup of aluminum oxide in the interface and introducing a heat creating resistance. If undetected, this heat source can ultimately cause ignition and an electrical fire.

Present day practices of electrical utility companies in the widespread use of aluminum wiring for main service connections, result in the main service connection, at the circuit breaker box, being the most predominant situs of this hazard.

Figure 5:
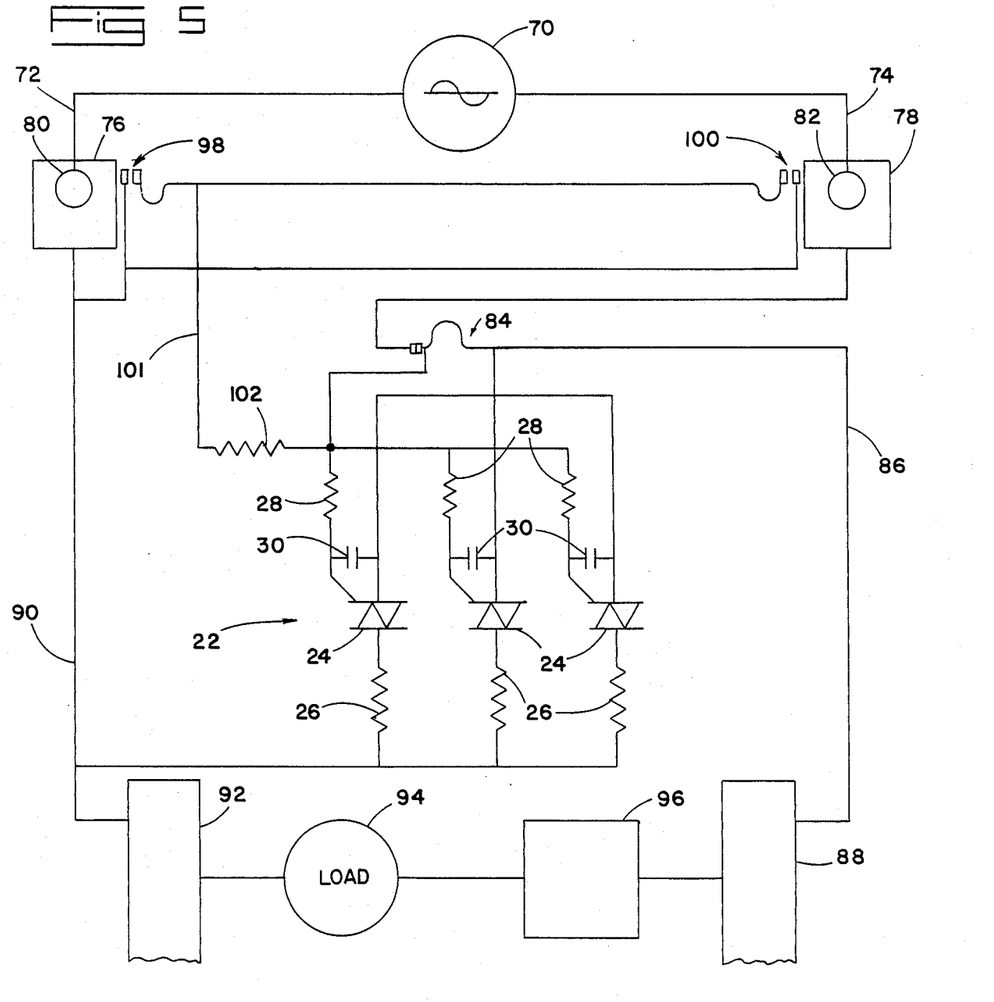
FIG. 5 is a schematic of a protective, current interrupting circuit which is further responsive to overheating in the terminals for a main electrical service connection.

FIG. 5 schematically illustrates a typical main service connection and branch circuitry. Electrical power is brought from a remote generator 70 by conductors 72, 74 (transformers and the other hot conductor being omitted for simplicity). These conductors are in the form of aluminum wiring and are connected to main terminals 76, 78 by binding screws 80, 82. The potential from terminal 78 is connected through a circuit breaker 84 by conductor to a bus bar 88. Terminal 76 is connected by conductor 90 to a second, neutral bus bar 92. Branch circuit loads are then connected across the bus bars 88, 92. One such load 94 is illustrated in series with a circuit breaker 96 to protect against overloads in the branch circuit. The circuit breaker 96 preferably includes short circuit protection means including a current sensor and dumping means as previously described.

The bimetallic element of the circuit breaker 84 again serves as a current sensor for detecting short circuit current flow and actuating a dumping circuit 22, to accelerate opening of the circuit breaker, all in accordance with the above description of FIG. 4.

The main terminal connection at binding screws 80, 82 are identifiable situses of overheating because of the aluminum wiring employed of the main service lines 72, 74. These terminals are monitored by normally open thermostats 98, 100 mounted adjacent thereto. The thermostats are connected in parallel to the terminal 76 by conductor 101, through a current limiting resistor 102 and the circuit breaker contacts, to the opposite side of the power source, at terminal 78, and to the gating terminals of the triacs 24, upstream of their current limiting resistors 28.

In the event an overheating condition exists at either binding screw 80 or 82, the associated thermostat, 98 or 100, will close. Upon such closure, current flow through the resistor 102 will impose a triggering voltage on the gate terminals of the triacs 24, thereby actuating the dumping means. The resultant increase in current flow through the main circuit breaker 84 will result in its substantially instantaneous opening, in the same fashion as upon a detection of short circuit current flow, previously described.

Figure 6:
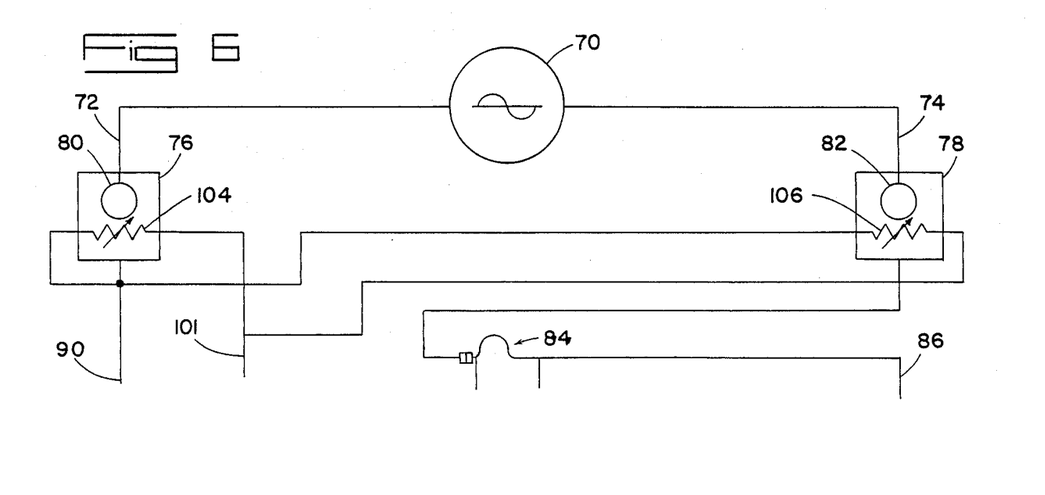
FIG. 6 illustrates an alternate means for sensing overheating of the main service connection terminals.

FIG. 6 illustrates an alternative means for sensing an overheated condition at the binding screws 80, 82. Thermistors 104, 106 are substituted for the thermostats shown in FIG. 5. The thermistors 104, 106 have a negative temperature coefficient, that is, their resistance decreases as their temperature increases. They are selected to gave a resistance such that when the temperature of the binding screw connections does not exceed a normal temperature, say 140 degrees Fahrenheit, the voltage at the gating terminals of the triacs is insufficient to cause them to be triggered. If the temperature at either binding screw exceeds such limit, then the resistance of the associated thermistor decreases, increasing current flow and imposing a triggering voltage on the triacs.

While main service terminals connections are the most readily identifiable locations of potential overheating, which would cause an "electrical" fire, other potential sources can be identified and monitored in the same fashion to actuate the dumping means.

From the above, it will be apparent that the present invention cooperates with existing devices which give protection against electrical fires arising from overloads. These devices presently take the form of circuit breakers or fuses. They may be characterized as including means for interrupting current flow through a load circuit, which are actuated in response to current flow above a rated value for a time sufficient to generate a predetermined heat rise, or energy level, time being an inverse function of the excursion of the rate of current flow above said rated value. Such predetermined heat rise being the maximum that would be generated by the transient current flow requirements of the load, as when the load is first placed in service.

A further and, potentially, very significant cost saving of the present invention is elimination of the necessity of hard conduit where it serves solely as a protective means against the hazards of short circuits.

Primarily the foregoing has been directed to protective circuits. The circuit breaker cartridge of FIG. 4 does, however, provide a means for incorporating this circuit into existing circuits.

There are many millions of existing electrical services for both residential and commercial establishments. The means now to be described provide an additional means for protecting against short circuit fires. These devices have in common the ability to be incorporated in existing branch circuits with a minimum effort.

Figure 7:
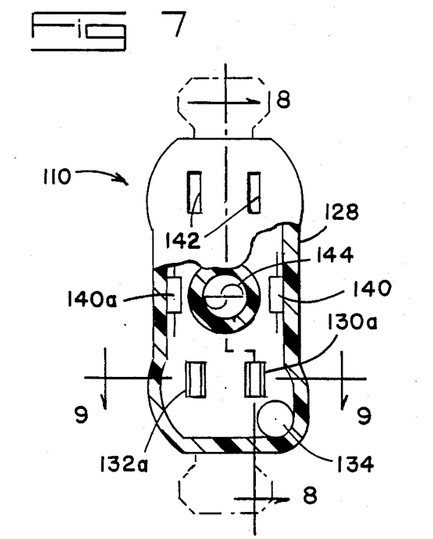
FIG. 7 is a view, partially in section, illustrating an adapter embodying the present invention.
Figure 8:
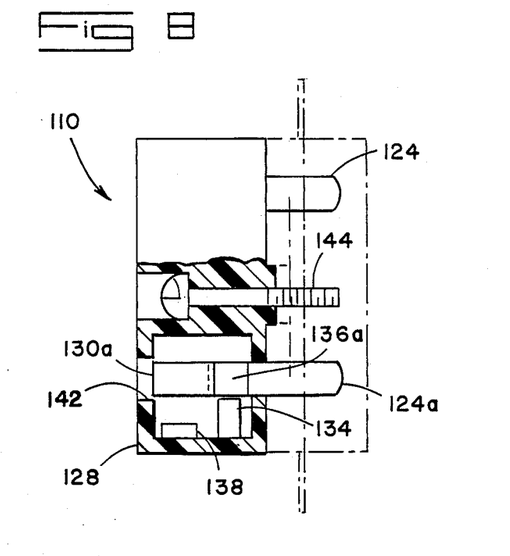
FIG. 8 is a section taken generally on line 8—8 in FIG. 7.
Figure 9:
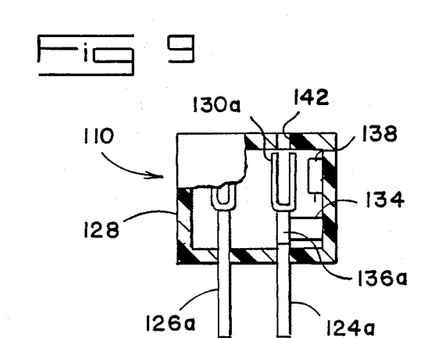
FIG. 9 is a section taken generally on line 9—9 in FIG. 7.

Reference is next made to FIGS. 7-9 which illustrate an adapter 110 which is adapted to be connected to a conventional duplex, outlet receptacle 112. Such receptacles are well known and take many forms.

Figure 10:
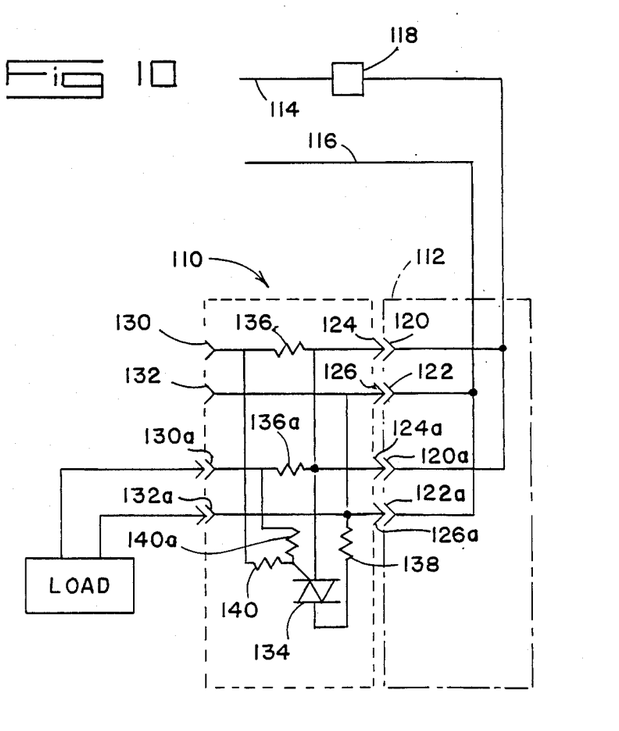
FIG. 10 is a schematic of the electrical components of this adapter, illustrating its incorporation in a branch circuit.
Figure 11:
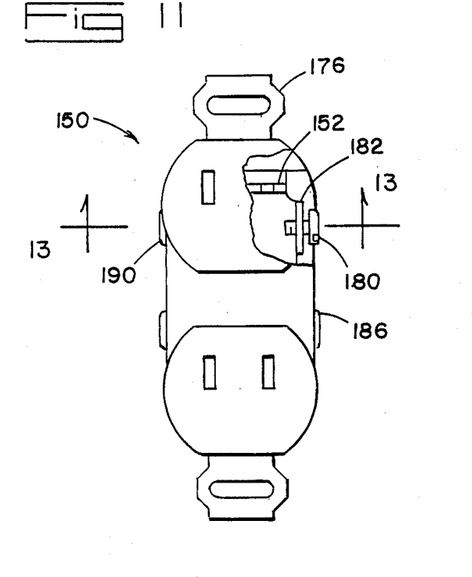
FIG. 11 is a view, partially in section, of a duplex receptacle embodying the present invention.

FIG. 10 illustrates connection of the adapter 110 into a typical branch circuit comprising a pair of conductors 114, 116 connected across a power source, with a circuit breaker 118 connected in series with line 114. The receptacle 112 comprises two pairs of female connectors 120, 122 and 120a, 122a which are respectively connected, in parallel, to the power lines 114, 116. In usual practice, the male connectors of the plug of the cord of an appliance, or the like, are inserted into a pair of female connectors to connect the appliance to the circuit.

The adapter comprises two pairs of male connectors 124, 126 and 124a, 126a, projecting from one side of a housing 128. Within the housing 128, the male connectors have U-shaped female connectors secured to their inner ends, being respectively identified by reference characters 130, 132, 130a and 132a.

The adapter 110 is simply "plugged" into a receptacle and, in effect, spaces female connectors outwardly. Electrical appliances may then be plugged into the adapter to connect them across the power source. The adapter provides short circuit protection in the same fashion as the previously discussed circuits.

To this end a dumping circuit is again provided. It comprises a triac 134 which has its main terminals connected across each of the pairs of male connectors 124, 126 and 124a, 126a. Current sensing resistors 136, 136a are connected in series with the male/female connectors 124/130 and 124a/130a. The main terminal of the triac is connected upstream of the resistors 136, 136a and its gate terminal is connected downstream thereof, whereby conductivity of the triac is dependent on the voltage drop across either of these sensing resistors.

A common current limiting resistor 138 is placed in series with the main terminal connection of the triac to the male connectors 126, 126a. Also separate current limiting resistors 140 are connected in series with the gate terminal connections to the downstream ends of the current sensing resistors 136, 136a.

The sensing resistors may, advantageously, be made a structurally integral part of the male/female conductors. Various resistive materials can be employed to provide this sensing resistance. Nickel iron alloys are exemplary of suitable materials. Thus, as seen in FIGS. 8 and 9, a length of this material is welded at one end to the male connector 124a and at its other end to the base of the U-shaped female connector 130a. The open ends of the female connectors are aligned with openings 142 in the outer side of the housing. This enables the male connectors of an electrical plug to be connected, in the usual fashion to the branch circuit, as is indicated in FIG. 10.

The triac 134, and resistors 138, 140 and 140a are mounted within the interior of the housing and all electrical connections therewith are also disposed interiorly of the housing. It is preferred that the outline of the adapter be compact and approximate that of the receptacle 112. It will be seen from FIG. 7 that these ends may be attained with only a minimum enlargement at one end, employing components that are now available.

Operation of the adapter is essentially the same as that of the protective circuits previously described. Iif a short circuit occurs in the load circuit connected to one of the pairs of connectors, as 130a, 132a, indicated in FIG. 10, the triac 134 will be tripped by in increase in current flow raising the voltage drop across the resistor 136a above the exemplary limit of 0.5 volts. Substantially instantaneously there is an increase in current flow through the conductors 114, 116 which trips the circuit breaker 116.

As before, if there is a short circuit causing the circuit breaker to trip, it must be reset in order to reenergize the circuit. Similarly, if a fuse is blown, it must be replaced. Particularly where the circuit is protected by a fuse, which can be defeated by a coin substitute, it is desirable that the protective function of the adapter not be defeatable by its removal to reenergize a load.

To this end, a clutch head screw 144 is employed to secure the adapter 110 to the receptacle 112. Receptacles are commonly provided with a central, threaded opening. This enables a decorative cover plate to be secured thereto. The cover plate, as seen in FIG. 8, may remain in place when an adapter in mounted on a receptacle. The screw extends through a central passageway in the housing, through the existing hole in the cover plate and is then threaded into the opening in the receptacle. The clutch head feature of the screw prevents its ready removal and defeating of the protection afforded by the adapter. Other forms of one way drive means for the screw could also be employed.

It will also be appreciated that the adapter could take many different forms all to the desired end of incorporating the electrical components within the housing. The housing could be of multipart construction, or of a unitary construction with the electrical components molded therein.

Reference is next made to FIGS. 11-14 for a description of an outlet receptacle 150 embodying the present invention and providing the same protection from short circuit fires. It comprises two pairs of female connectors 152, 154 and 152a, 154a into which the male connectors of electrical plugs are inserted to connect an appliance across a branch circuit. Again the branch circuit may comprise two primary conductors 156, 158, with a circuit breaker 160 connected in series in the conductor 156. The pairs of female connectors are respectively connected to the primary conductors 156, 158.

Figures 13, 14:
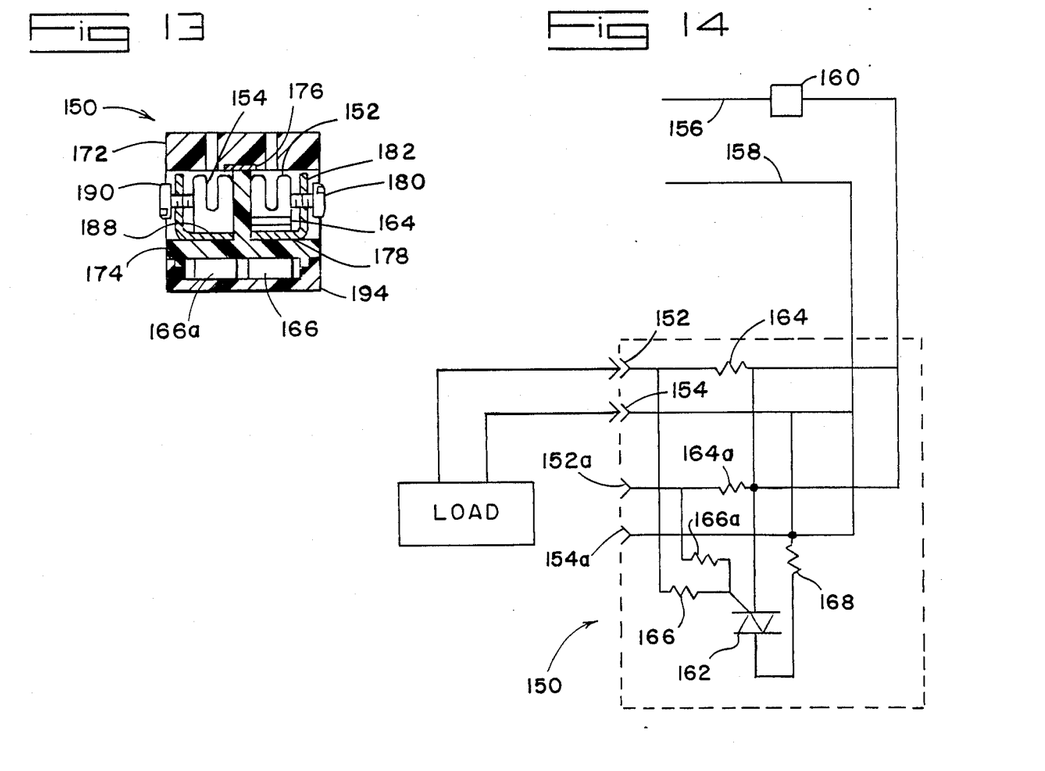
FIG. 13 is a section taken generally on line 13—13 in FIG. 11.
FIG. 14 is a schematic of the electrical components of the receptacle illustrating its incorporation in an a branch circuit.

Dumping means are likewise provided and comprise a triac 162 connected across the main connectors, or the connections made to the pairs of female connectors. Sensing resistors 164, 164a are provided in series with one of each of the two pairs of female connectors. The gate terminal of the triac 162 is then connected across the sensing resistors 164, 164a. Separate current limiting resistors 166, 166a are provided for the gate terminal connections. A common resistor 168 is provided for limiting current flow through the triac.

Figure 12:
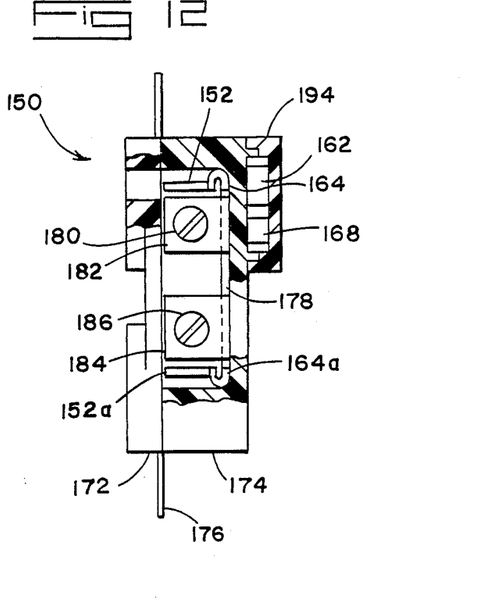
FIG. 12 is a side view, partially in section, of the receptacle seen in FIG. 11

Reference is made to FIGS. 12 and 13 for a better understanding of the female connectors 152, 152a and current sensing resistors 164, 164a.

The receptacle comprises an outer housing member 172 and an inner housing member 174. A metal strip 176 extends through and between these housing members to provide both mounting and grounding means for the receptacle.

The female connectors 152, 152a are connected to a conductive strip 178 and take the form of split portions into which the male connector of a plug can be inserted. The resistors 164, 164a can take the form of a U-shaped members interposed between the female connecters and the strip 178. A binding screw 180 is threaded into a tab 182 bent upwardly from the strip 178. The primary conductor 156 is connected to the receptacle by this binding screw. A second tab 184 and binding screw 186 may be provided to permit other receptacles to be connected with the primary conductor 156.

The female connectors 154, 154a are similarly formed. There being no current sensing resistor, the split portions forming these connectors are simply bent portions of a strip 188. A binding screw 190 is threaded into a bent tab 192 to provide a connection with the other primary conductor 158.

The triac and the resistors 166, 166a and 168 are mounted on the receptacle housing, preferably interiorly thereof. To this latter end a compartment is formed on the rear side of the housing member 174. The compartment may be formed by a cap 194 which is simply snapped in place and resiliently held in assembled relation. Appropriate conductors connect these components as indicated in FIG. 14.

The circuit of this embodiment functions as previously described. A short circuit in a load connected to either pair of female connectors 152, 154 or 152a, 154a increases the voltage drop across the resistor 164 or 164a and triggers the triac. Substantially instantaneously the circuit breaker will trip and current flow to the load interrupted. It will be noted that the U-shaped form of the resistors 164, 164a provides an inductance which contributes to the impedance of this element. Again a nickel iron alloy can be employed to obtain the necessary impedance.

Figure 15:
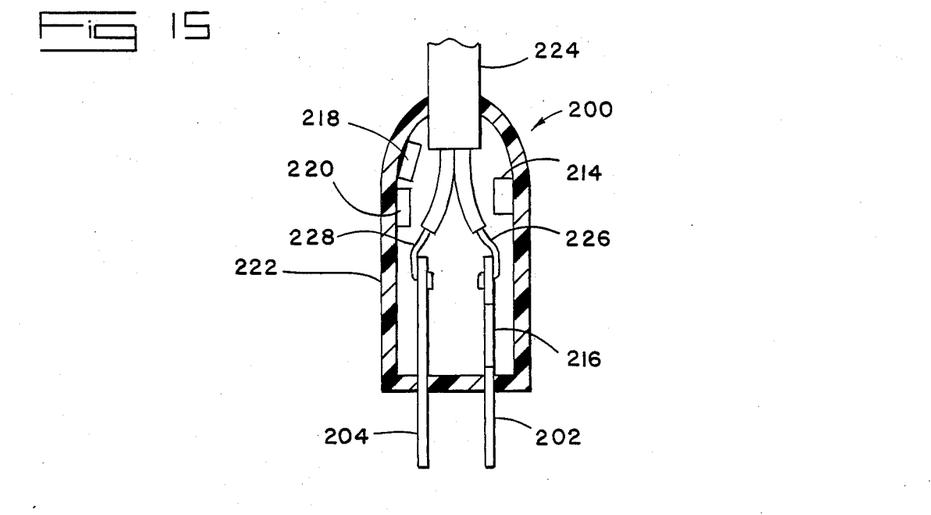
FIG. 15 is a view, partially in section, illustrating an electrical cord plug embodying the present invention.
Figure 16:
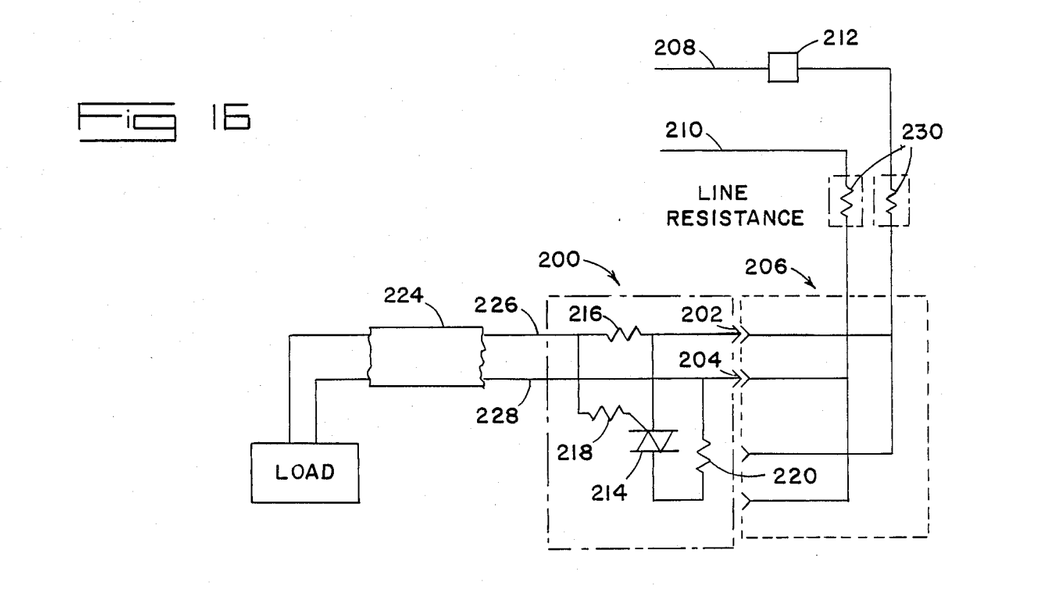
FIG. 16 is a schematic of the plug of FIG. 15 connecting a load to a branch circuit.

A further means for protecting a load from a short circuit is illustrated by an electrical cord plug 200 illustrated in FIGS. 15 and 16.

This plug comprises a pair of male connectors 202, 204 which are adapted for connection with the female connectors of a receptacle 206, or other device which provides a connection with the primary conductors 208, 210 of a branch circuit that is protected by a circuit breaker 212.

Again a dumping circuit comprising a triac 214 is provided. A current sensing resistor 216 is provided in series with the connector 202. The main terminals of the triac are connected across the connectors 202, 204 and its gate terminal is connected across the sensing resistor 216. A resistor 218 limits gate current flow and a resistor 220 limits triac current flow.

The structural configuration of the plug 200 is best shown in FIG. 15. It will be seen that the plug comprises a housing 222 from which the male connectors 202, 204 project. The resistor 216 is a segment of nickel iron alloy welded to the connector 202. The plug is secured, as by molding, to an electrical cord 224 which sheaths two electrical conductors which are connected to the inner ends of the male connectors 202, 204.

The triac 214, and resistors 218, 220 are mounted within the housing 222 and appropriately connected to the connectors 202, 204 illustrated in FIG. 16.

Again the operation of this plug in protecting against short circuits is the same as before described. The triac is triggered by excess current flow across resistor 216. Once conductive, the triac increases current flow through the circuit breaker 212, causing it to trip in a minimal time sufficient limit short circuit energy to a safe level.

The last three embodiments of the invention place the dumping means at a point remote from the service connection and the fuse or circuit breaker protecting the circuit. This brings into play the voltage drop in the primary conductors (conductors 208, 210 in FIG. 16). Line resistance is indicated, in FIG. 16 by resistances 230.

As was discussed above, short circuit current flow can be sufficient for the voltage drop across the line resistances 230 to drop the voltage across the arc to a point where it extinguishes. When the triac is triggerred to a conductive state, the increased current flow through the primary conductors increases the voltage drop across the line resistances 230 further. The voltage drop across the short circuit arc is thus further reduced. The additional reduction can be sufficient to extinguish the arc and thus interrupt short circuit current flow even before the circuit breaker is tripped.

In the foregoing description of the several embodiments herein no mention has been made of ground circuits and connections which are routinely provided in electrical circuits. The present invention operates independently of these ground circuits. For that reason no mention of them has been made.

While the object of the present invention is the prevention of electrical fires, it is to be recognized that that end is not necessarily attained in an absolute sense by practicing the concepts herein taught. The energy level of common 120 volt power circuits is more than sufficient to ignite a fire. Fuses and circuit breakers give a level of assurance that short circuits and overload conditions will not ignite a fire. The present invention significantly increases the level of assurance that short circuits, and particularly "arc" short circuits will not ignite a fire. However, the invention does not provide an absolute guarantee against electrical fires.

The various components described in connection with the present circuits are commercially available, or can be configured in accordance with known principles, all within the abilities of those skilled in the art, dependent upon the specific requirements of a given load circuit, whether it be a main service circuit or branch circuit, or other circuits separately embodied in various forms of equipment.

In the same vein, the described embodiments of the invention are exemplary and variations in specific components will be apparent to those skilled in the art, all within the spirit and scope of the present invention, which is to be derived from the following claims.

Having thus described the invention, what is claimed as novel and desired to be secured by Letters Patent of the United States is:

1. A protective circuit for protecting against electrical fires caused by "arc" short circuits in a load circuit connected across an electrical power source, said protective circuit comprising
   a current interrupter selected from the class consisting fuses and circuit breakers,
   said interrupter being connected in series between one side of the power source and the load circuit and having, as operating characteristics:
   a. a rated current reflecting the maximum current flow for steady state operation, b. a minimum response time for actuation when current flow to the load circuit exceeds a magnitude several fold greater than the rated current flow, and c. Non-responsiveness to current flows intermediate the rated current and the several fold value for periods of time generating energy levels moderately in excess of the energy limit of steady state, rated current flow, means for sensing current flow to said load circuit, and dumping means for providing a current flow path between the interrupter and the other side of said power source, said dumping means being normally inoperative and switchable to an operative state providing a current flow path connecting the interrupter across the power source, characterized in that said dumping means are switched to an operative state in response to the current sensing means sensing an intermediate current level current greater than the maximum current flow for the energy levels of normal transient overloads, which sensed current level reflects an "arc" short circuit having an energy level in the same range as a normal transient overload, whereby the current interrupter will be actuated substantially instantaneously when there is current flow indicative of an "arc" short circuit and protection provided against a fire being ignited thereby.

2. A protective circuit as in claim 1 wherein
the power source is an alternating electrical potential,
the current sensing means comprise an impedance connected in series between the current interrupter and the load circuit,
the dumping means include at least one triac having its main terminals connected in series with one side of the current interrupter and the other side of the power source, and one main terminal and the gate terminal thereof are connected across the impedance, and
the triac is triggerred to an operative state by an increase in the voltage drop across said impedance exceeding a value which reflects the maximum current flow during normal transient overloads in the load circuit, which current flow is substantially higher than the rated current for the current interrupter.

3. A protective circuit as in claim 2 wherein
the dumping means further includes
a resistor for limiting current flow through the triac, said resistor being in the current flow path between the current interrupter and the other side of the power source but not in series with the load circuit,
whereby said current limiting resistor does not create any energy losses during normal operation of the circuit.

4. A protective circuit as in claim 3 wherein
the voltage drop required for switching the triac to an operative condition is in the order of 0.4% of the potential of the electrical power source,
whereby the losses associated with the protective circuit are further minimized.

5. A protective circuit as in claim 2 wherein the current sensing impedance is an inductive coil.

6. A protective circuit as in claim 2 wherein
the dumping means comprise a plurality of triacs connected in parallel with each other and in series between one side of the current interrupter and the other side of the power source, and the gates and one main terminal of each are connected across the current sensing impedance.

7. A protective circuit as in claim 6 further comprising
a neon bulb connected from the upstream side of the current interrupter to the downstream side of one of said triacs,
a common return conductor for the neon bulb and said one triac to the other side of said power source, and
a fuse interposed in said common return conductor,
said bulb being normally illuminated by said connections, and current flow through said one triac, when triggerred, being sufficient to blow said fuse, thereby extinguishing said bulb to indicate current has flowed through said triac,
whereby the cause for actuation of the current interrupter can be identified as a short circuit when current flow through the dumping means is indicated and a short circuit failure can be ruled out when such flow is not indicated.

8. A protective circuit as in claim 2 further comprising indicia means, and
means responsive to current flow through said triac for actuating said indicia means to indicate such flow,
whereby the cause for actuation of the current interrupter can be identified as a short circuit when current flow through the dumping means is indicated and a short circuit failure can be ruled out when such flow is not indicated.

9. A protective circuit as in claim 2 in combination with
an electrical service installation including main service terminals energized by aluminum wire conductors secured thereto,
branch circuit bus bars energized from said main service terminals and having branch circuit loads connected thereacross,
said protective circuit being connected in series with the connection to one of said bus bars,
means disposed adjacent to said aluminum terminal connections for sensing an overheated condition, and
means responsive to the sensing of an overheated condition for triggerring said triac.

10. A protective circuit as in claim 9 wherein
the means for sensing an overheated condition comprise a thermostat adjacent each aluminum terminal condition.

11. A protective circuit as in claim 9 wherein
the means for sensing an overheated condition comprise a thermistor having a negative temperature coefficient, mounted adjacent each aluminum terminal connection.

12. A protective circuit as in claim 1 wherein
the power source is an alternating electrical potential,
the current interrupter is a circuit breaker having an inductive coil which provides an electromagnetic force effective in opening contacts to interrupt current flow to the load circuit, said coil serving as the current sensing means, and
the dumping means include at least one triac having its main terminals connected in series with one side of the current interrupter and the other side of the power source, and one main terminal and the gate terminal thereof are connected across the inductive coil of the circuit breaker, and the triac is triggerred to an operative state by an increase in the voltage drop across said inductive coil exceeding a value which reflects the maximum current flow during normal transient overloads in the load circuit, which current flow is substantially higher than the rated current for the current interrupter.

13. A protective circuit as in claim 12 wherein the dumping means further includes a resistor for limiting current flow through the triac, said resistor being in the current flow path between the circuit breaker and the other side of the power source but not in series with the load circuit, whereby said current limiting resistor does not create any energy losses during normal operation of the circuit.

14. A protective circuit as in claim 1 further comprising indicia means for indicating that there has been current flow through the dumping means, whereby the cause for actuation of the current interrupter can be identified as a short circuit when current flow through the dumping means is indicated and a short circuit failure can be ruled out when such flow is not indicated.

15. A protective circuit as in claim 1 further including means for sensing an overheated condition at a remote location, and means responsive to the sensing of an overheated condition to switch the dumping means to a conductive state and thereby interrupt current flow to the load circuit.

16. A circuit breaker cartridge providing improved protection against "arc" short circuit fires, said cartridge having a rated current value for steady state circuit operation and being non-responsive to current flow below a maximum value for normal transient overloads, said cartridge including a thermostat comprising a bimetallic element controlling contacts which may be opened by current flow, above a given limit, through the bimetallic element, electrical contacts adapted to place the bimetallic element and its contacts in series between one side of a power source and an electrical load circuit, upon insertion of the cartridge into the receptacle, an impedance connected in series with the load circuit to provide means for sensing current flow in the load circuit, a triac having one main terminal connected to the downstream side of the current sensing means, and means for connecting the other main terminal of the triac to the other side of the power source, upon insertion of the cartridge in the receptacle, the gate terminal of the triac being connected to the opposite side of the current sensing means, said triac being triggered to a conductive conductive state upon the voltage drop across said impedance exceeding a value reflecting the maximum value for normal transient overloads, whereby current will be dumped through the triac and the element contacts will be opened to interrupt current flow, substantially instantaneously upon the occurrence of an "arc" short circuit.

17. A circuit breaker cartridge as in claim 16 wherein the bimetallic element is in the form of an inductance and serves as the current sensing means and the gate and first main terminal of the triac are connected across the bimetallic element.

18. An adapter for providing protection against "arc" short circuit fires, said adapter being adapted for use in combination with a an electrical outlet receptacle where the receptacle is incorporated in a branch circuit comprising a power source, a current interrupter selected from the class consisting of fuses and circuit breakers, said current interrupter having a rated current value and being non-responsive to current flows, incident to normal, transient overloads, said receptacle having one female connector connected in series with the current interrupter and to one side of the power source and a second female connector connected to the other side of the power source, said adapter comprising a housing, a pair of male connectors projecting from said housing and adapted to be receive by the female connectors of the outlet receptacle, a pair of female connectors disposed within said adapter housing, and adapted to receive the male connectors of a plug for connecting an electrical load to the branch circuit, said female connectors being respectively connected to the projecting male connectors of the adapter, a triac and a current sensing impedance disposed within said housing, said impedance being connected in series between one of the connected male and female connectors, the main terminals of the triac being respectively connected to the male connectors of the adapter, and the gate terminal and one of the main terminals being connected across the current sensing impedance, said triac being triggered to a conductive state upon the voltage drop across said impedance exceeding a value reflecting the maximum value for normal transient overloads, whereby current will be dumped through the triac and the current interrupter will be actuated to interrupt current flow, substantially instantaneously upon the occurrence of an "arc" short circuit.

19. An adapter as in claim 18 which is adapted for use with a duplex outlet receptacle having a second pair of female connectors connected in a branch circuit in the same fashion as the first pair, and the adapter comprises a second pair of male connectors projecting from the housing, a second pair of female connectors disposed within the housing and connected, respectively, to the second pair of male connectors, a second current sensing impedance is disposed within the housing and is connected in series between one of the connected male and female connectors of the second pair, and the main terminals of the triac are respectively connected to the second pair of male connectors of the adapter, and the gate terminal and one of the main terminals are connected across the second current sensing impedance, whereby the current interrupter will be actuated, substantially instantaneously, by an "arc" short circuit in a load connected to either of the female connectors of the adapter.

20. An adapter as in claim 19 further comprising
a current limiting resistor disposed within said housing and interposed between the triac and the connections of the other main terminal thereof with the respective male connectors.

21. An adapter as in claim 19 wherein the receptacle has a threaded opening between the pairs of female connectors and
the adapter has a passageway aligned with said threaded opening when the male connectors of the adapter are inserted into the female connectors of the outlet receptacle, and
a threaded member insertable through said passageway and threadable into said opening to secure the adapter to the receptacle, said threaded member being characterized by means preventing its removal by reversal of the means employed to secure it in the threaded opening.

22. An adapter as in claim 18 wherein
the impedance is a length of resistive material connected at its opposite ends with the male and female connectors with which it is in series.

23. An outlet receptacle adapted for incorporation in a branch circuit comprising
a power source,
a current interrupter selected from the class consisting of fuses and circuit breakers,
said current interrupter having a rated current value and being non-responsive to current flows incident to normal transient overloads,
said receptacle comprising
a housing,
two pairs of female connectors disposed within said housing,
one of each pair of connectors being adapted for connection with one side of the power source and the other of each pair being adapted for connection with the other side of the power source,
a triac and current sensing impedances disposed within said housing,
said current sensing impedances being connected in series with one connector of each pair of female connectors, and the main terminals of said triac being connected across each pair of connectors, and the gate terminal being connected across each sensing impedance,
said triac being triggered to a conductive state upon the voltage drop across said impedance exceeding a value reflecting the maximum value for normal transient overloads, whereby the current interrupter will be actuated, substantially instantaneously, by an "arc" short circuit in a load connected to either of the female connectors of the receptacle.

24. A receptacle as in claim 23 wherein
each impedance is a length of resistive material connected at one end to a female connector and at its other end to a male connector, said resistive material being curved to provide an impedance having both resistance and reluctance.

25. A plug for connecting an electrical appliance to a branch circuit comprising
a power source,
a current interrupter selected from the class consisting of fuses and circuit breakers,
said current interrupter having a rated current value and being non-responsive to current flows incident to normal transient overloads,
said plug comprising
a housing having a pair of male connectors projecting from one end and attached to an electrical cord at its opposite end, the conductors of said cord being connected, respectively, to said connectors, internally of said housing,
a triac and a current sensing impedance disposed within said housing,
said impedance being connected in series between one of the male connectors and the cord conductor connected thereto,
the main terminals of the triac being respectively connected to the male connectors and the gate terminal being connected across the current sensing impedance,
said triac being triggered to a conductive state upon the voltage drop across said impedance exceeding a value reflecting the maximum value for normal transient overloads,
whereby current will be dumped through the triac and the current interrupter will be actuated to interrupt current flow, substantially instantaneously upon the occurrence of an "arc" short circuit.

26. A plug as in claim 25 wherein
the impedance is a length of resistive material connected at its opposite ends between the connected male and female connectors.

27. An adapter as in claim 25 wherein
the impedance is a length of resistive material welded at on end to a male connector and connected at its opposite end to one of the cord connectors.

* * * * *